United States Patent
Pontoppidan

(10) Patent No.: US 6,443,119 B1
(45) Date of Patent: Sep. 3, 2002

(54) PISTON WITH ACTIVE GUIDING HEAD, AND ASSOCIATED COMBUSTION CHAMBER

(75) Inventor: Michaël Pontoppidan, Colombes (FR)

(73) Assignee: Magneti Marelli France, Nanterre (FR)

( * ) Notice: Subject to any disclaimer, the term of this patent is extended or adjusted under 35 U.S.C. 154(b) by 0 days.

(21) Appl. No.: 09/762,624

(22) PCT Filed: Aug. 6, 1999

(86) PCT No.: PCT/FR99/01952

§ 371 (c)(1),
(2), (4) Date: Feb. 8, 2001

(87) PCT Pub. No.: WO00/09872

PCT Pub. Date: Feb. 24, 2000

(30) Foreign Application Priority Data

Aug. 11, 1998 (FR) .......................................... 98 10293

(51) Int. Cl.$^7$ ................................................. F02B 3/02
(52) U.S. Cl. ........................ 123/294; 123/305; 123/294
(58) Field of Search ................. 123/294, 298, 123/305, 193.6, 193.4

(56) References Cited

U.S. PATENT DOCUMENTS

| | | |
|---|---|---|
| 5,115,774 A | 5/1992 | Norihiko et al. |
| 5,727,520 A | 3/1998 | Wirth |
| 5,927,244 A * | 7/1999 | Yamauchi et al. .......... 123/305 |
| 6,035,823 A * | 3/2000 | Koike et al. ................ 123/298 |
| 6,129,065 A * | 10/2000 | Ueda et al. ............... 123/193.6 |

FOREIGN PATENT DOCUMENTS

| | | |
|---|---|---|
| DE | 197 13 029 | 3/1997 |
| DE | 197 13 030 | 3/1997 |
| FR | 2 757 211 | 12/1996 |

* cited by examiner

*Primary Examiner*—Erick Solis
(74) *Attorney, Agent, or Firm*—Henderson & Sturm LLP

(57) ABSTRACT

The invention concerns a combustion chamber delimited by a piston head having, inside a planar peripheral ring, a recess in the form of a concave bowl open towards the chamber and off-center on the piston axis (X—X) side which faces towards the injector inclined on the axis (X—X) and is laterally implanted on the cylinder head for direct injection into the chamber, and on the axis (X—X), a boss having, in layout, a horseshoe or crescent shape which partially enclosed the recess. The boss has an overhanging edge above the connection between the recess and the boss, whereof the upper surface is convex towards the chamber. The width of the overhanging edge is at its maximum in the horseshoe shaped boss base and gradually decreases until it substantially disappears at the tips of the two wings of the horseshoe-shaped boss, thereby ensuring a good preparation for the air/fuel mixture in the center of the chamber, opposite the axial plug at the chamber top. The invention is applicable to internal combustion engine with applied ignition and direct injection.

32 Claims, 1 Drawing Sheet

PISTON WITH ACTIVE GUIDING HEAD, AND ASSOCIATED COMBUSTION CHAMBER

CROSS-REFERENCE TO RELATED APPLICATIONS

This application is the U.S. national phase of International Patent Application No. PCT FR99/01952 filed Aug. 6, 1999 which claims the priority of French Application No. FR 98 10293 filed Aug. 11, 1998, the disclosure of both of the above-identified applications being incorporated herein by reference in their entirety.

BACKGROUND OF THE INVENTION

1. Field of the Invention

The invention relates to a piston, having a head with a geometry such that it affords an active guiding action, for an internal combustion engine, in particular of the type operating with controlled ignition and direct fuel injection.

The invention also relates to a combustion chamber co-operating with a piston as proposed by the invention, for an internal combustion engine having controlled-ignition and in which fuel is injected directly into the combustion chamber.

More specifically, the piston proposed by the invention delimits a cooperating combustion chamber with a cylinder in which said piston is axially slidable, and a cavity provided in a cylinder head, facing the piston head, joined to each of the engine cylinders, the piston head having an end face directed towards the combustion chamber and which has, inside a planar peripheral ring extending perpendicular to the axis of the piston, firstly, a bowl-shaped concave recess open towards the combustion chamber and disposed eccentrically on one side of the piston axis and, secondly, a boss projecting into the combustion chamber out from the peripheral ring and eccentrically disposed on the other side of the piston axis, said recess and boss being symmetrical relative to a diametric direction of the piston head, as disclosed by FR 2 757 211.

2. Description of the Prior Art

It is generally known that various geometries have recently been suggested for the end faces of piston heads in internal combustion engines and hence also for the associated combustion chambers, in order to improve the process of preparing the air/fuel mixture with a view to reducing simultaneously the fuel consumption of these engines and the pollution which they create through their combustion gases.

To this end, it has been proposed that operation of the engine, particularly when used at low load, be controlled with what is known as a poor air/fuel mixture (in which the proportion of air is greater than the stoichiometric proportion), which may be homogeneous or stratified, particularly if it is outside the flammability limits of the homogeneous mixture, whereas when the engine is operating at medium or high loads, the latter should be supplied with a fuel mixture in a stoichiometric proportion, the mixture being rich only under certain particular engine operation conditions, particularly certain transitory conditions or when cold-starting, for example.

Irrespective of the richness of the fuel mixture supplying the engine, the combustion characteristics of this mixture in a combustion chamber will depend on numerous factors, including geometric factors, relating to the shape of the combustion chamber and hence the geometry of the end face of the corresponding piston head (and, therefore the shape of the recess and boss in the head of a piston as described above), aerodynamic factors, and in particular the velocity and turbulence of the liquid fuel jet, of the air sucked into the cylinder and of the gaseous flow inside the combustion chamber, as well as dimensional and geometric factors pertaining to the injector, such as the number, the shape and dimensions of the injection orifices, the internal structure and the pressure delivering fuel to the injector.

It is evident that optimisation of the internal aerodynamics of a combustion chamber, in particular at the timing of the air admission, fuel injection and ignition of the combustible mixture, are crucial design factors for an engine with controlled-ignition and direct injection, especially in terms of their contribution to preparing as an efficient as possible fuel mixture, be it stoichiometric or poor, in a region of the combustion chamber which is conducive to good combustion (good flammability and controlled propagation of the flame front in combusting the mixture).

The geometry of the combustion chamber is specifically designed to promote certain aspects of the mixture-forming process, in particular the global structure of the aerodynamics, such as what is referred to as the swirl flow describing a rotary macro-structure about the axis of the combustion chamber and what is referred to as the tumble flow describing the axial motion which enables the deflection of the fuel jet or jets through the main flow to be characterised, thereby providing a better evaluation of the distribution of the fuel and its vaporisation in the combustion chamber. At the end of the compression phase, the geometry must also be conducive to promoting a certain degree of turbulence in the fuel charge so that the parameters governing exchange of mass in the vicinity of the flame front can be controlled locally, thereby determining the combustion speed.

In order to improve distribution and vaporisation of the fuel in the combustion chamber as well as the air-fuel mixture with a view to improving combustion, different geometries specific to the combustion chamber have been proposed recently, in which one or more concave bowl-shaped recesses are provided in the end face of the piston head and open towards the combustion chamber, the injector directing the fuel jet into one of these concave recesses which deflects this jet towards the centre of the combustion chamber facing the ignition plug, whilst it is simultaneously atomised into fine droplets of fuel and/or vaporised and mixed with the air admitted to the combustion chamber by means of the flow and turbulence modified therein due to the presence of the concave recess or recesses.

By way of example, DE 197 13 030 describes a four-stroke internal combustion engine, with controlled ignition and direct injection, in which the end face of a piston head delimiting a combustion chamber has an arrangement of substantially H-shaped guide ribs projecting towards the combustion chamber and comprising two longitudinal ribs, parallel and at a distance apart, perpendicular to the longitudinal plane of the engine intersecting the axes of the cylinders thereof, and joined to one another by a transverse rib, parallel with the longitudinal plane of the engine and substantially perpendicular to the longitudinal ribs. Designed to optimise the degree of turbulence occurring locally at the end of the compression phase and amplify the aerodynamic tumbling motion of the gas admitted to the cylinder with a view to improving combustion by specifically acting on the speeds and distribution of the fuel and combustive air, these ribs delimit, between them and with the peripheral planar ring of the piston head, four concave bowl-shaped recesses which are open towards the chamber. One of the two central recesses (between the H-shaped ribs) receives the fuel jet from an injector mounted in the side of the cylinder head, in which the cavity delimiting the combustion chamber is a roof-shaped cavity with two inclined faces, the injector opening into the base of one of the two inclined faces between two admission valves co-operating with the admission ports in this inclined face, the axis of the injector being inclined relative to the axis of the piston and combustion chamber and contained in a radial plane intersecting this axis, with which the plug mounted in the cylinder head is aligned at the top of the combustion chamber.

In DE 197 13 029, the piston head has, on its end face directed towards the combustion chamber, a structure of T-shaped ribs projecting towards the combustion chamber and which delimit in this end face, in conjunction with the planar peripheral ring of the piston head, three concave bowl-shaped recesses open towards the combustion chamber, one of which receives the fuel jet from the injector, having an inclined axis relative to the axis of the piston and plug and directed towards this axis, but arranged in the apex of the combustion chamber at one end of the join between the two inclined faces delimiting the roof-shaped cavity in the piston head to form the corresponding part of the combustion chamber.

In U.S. Pat. No. 5,727,520, the end face of the piston head has a very open, U-shaped guide rib projecting towards the combustion chamber, delimiting two concave recesses open towards the combustion chamber, the one located inside the U receiving the fuel jet from an injector centrally disposed in the top of the roof-shaped combustion chamber with two inclined faces, the injector being slightly inclined relative to the axis of the piston and combustion chamber, whilst the plug is inclined still further relative to this axis and disposed to the side in one of the two inclined faces of the roof-shaped cavity of the cylinder head, on the admission side, the U formed by the ribbing in the piston head being open towards the exhaust.

In these various embodiments, the ribs bounding the concave recesses on the piston head are essentially designed to modify the flow with a view to amplifying the tumble motion whilst promoting local turbulence so as to enhance the quality of the air/fuel mixture, its flammability and its combustion speed, the aim generally being to improve combustion in order to reduce consumption and pollution.

BRIEF SUMMARY OF THE INVENTION

The underlying purpose of the invention is to improve performance in terms of consumption and pollution even more than the designs disclosed in the above-mentioned patents, by improving the level of local turbulence still further at the end of compression phase as well as the distribution and vaporisation of the fuel in the combustion chamber by means of a combined strategy of aerometric guidance and guidance by means of a solid wall, making the geometry of the combustion chamber more conducive to producing a good preparation of the directly injected stratified poor mixture in particular, in order to guarantee efficient combustion, depending on the position of the plug, and in order to create an air/fuel mixture in stoichiometric proportions in the central volume of the combustion chamber facing the plug.

Another objective of the invention is to achieve the above-mentioned improvements by perfecting a piston head of the type known from FR 2 757 211, the end face of which, bounding the combustion chamber, has, inside a planar peripheral ring, perpendicular to the axis of the piston, firstly, a bowl-shaped recess with a concave base open towards the combustion chamber and eccentrically disposed on one side of the piston axis, and, secondly, a boss projecting towards the combustion chamber out from the peripheral ring, and eccentrically disposed on the other side of the piston axis, the recess and the boss being symmetrical relative to a diametric direction of the piston head.

To this end, the piston with an active guiding head, of the abovementioned type and disclosed in FR 2 757 211, proposed by the invention, is characterised in that the boss, seen in a plan view, parallel with the piston axis, is of a substantially horseshoe shape partially surrounding said recess, which is also surrounded by an arc of said planar peripheral ring, and in that the boss has an overhanging rim above the join of said recess to said boss, at least on a level with the base of the substantially horseshoe-shaped boss and at the parts of wings of the horseshoe-shaped boss adjacent to said base.

Accordingly, the shape of the combustion chamber and more specifically the shape of the recess and the boss on the piston is such that it creates turbulence conducive to forming a good air/fuel mixture, whilst allowing the jet of fuel from the injector to be deflected towards the centre of the combustion chamber, thereby producing better atomisation and vaporisation of the fuel.

Advantageously, in addition, the overhanging rim does not have a sharp edge but, on the contrary, is a rim with a rounded cross section and, what is more, the amplitude of the overhang of said rim, viewed in a plane perpendicular to the piston axis, is gradually attenuated or less pronounced from the centre of the base of the horseshoe boss towards the end of each of the two wings of said boss, on a level with which ends the overhang is virtually zero.

This technical feature reduces or even obviates the need for devices that would otherwise be necessary upstream within the air supply circuit to create a swirling motion of the gas in the combustion chamber, these upstream devices being complex and expensive.

Moreover, the depth of the recess, viewed parallel with the piston axis, is advantageously variable and is deeper in a part of the recess which is not adjacent to said base of said horseshoe-shaped boss, this maximum depth as well as, more generally, the profile of the recess bottom preferably depending in particular on the diameter of the piston as well as the angular position of the injector relative to the axis of the piston and combustion chamber.

Advantageously, moreover, the horseshoe-shaped boss has a convex face directed towards the combustion chamber and with a radial width, relative to the piston axis, which is at its maximum in the diametric direction of symmetry of the recess and boss on the piston head and progressively decreases on either side of this direction, into the wings of the horseshoe-shaped boss. As a result of this advantageous feature, the internal volume of the combustion chamber occupied by a gaseous mixture exhibiting poor conditions of flammability and mixture, can be reduced.

Simultaneously, the planar peripheral ring has a variable radial width, being at its minimum on said diametric direction of symmetry of the recess and boss, and, on the side located after said boss relative to said recess, the radial width of the peripheral ring progressively increases on either side of its section of minimum width out to the sides of the wings of the horseshoe-shaped boss, so that this shape of boss in conjunction with this enlargement of the planar peripheral ring facilitates a lateral sweeping of the unburned gases, in particular towards the central combustion zone.

The invention also relates to a combustion chamber, for an internal combustion engine with controlled ignition and direct injection, delimited between a piston head, axially slidable in a cylinder of the engine, and said cylinder as well as a cavity arranged facing said piston head in a cylinder head joined to said cylinder, an ignition plug being provided in the cylinder head substantially coaxial with the piston, and a fuel injector also being provided in the cylinder head to deliver at least one fuel jet into the combustion chamber directed along an inclined axis relative to the axis of the piston, the combustion chamber proposed by the invention being characterised in that the piston is a piston as proposed by the invention and defined above, the inclined axis of the fuel jet being in a substantially radial plane intersecting the piston axis and said diametric direction of symmetry of said recess and boss of the piston head, said fuel jet being directed into said recess and towards said overhanging rim of the base of said horseshoe-shaped boss, in order to produce an excellent active guiding action.

In addition, the combustion chamber is advantageously of a known high-performance type, in which the corresponding cavity of the cylinder head is a substantially roof-shaped cavity with two inclined faces, into one of which there open said injector and at least one air admission duct selectively closed and opened by at least one admission valve, substantially facing said recess of the piston head, whilst at least one exhaust duct, selectively closed and opened by at least one exhaust valve, opens into the other of said inclined faces substantially facing said boss of the piston head.

Excellent performance has been achieved in a combustion chamber of this type with an injector inclined relative to the piston axis so that the axis of said fuel jet subtends an angle of between approximately 80° and approximately 45° with the piston axis.

BRIEF DESCRIPTION OF THE SEVERAL VIEWS OF THE DRAWINGS

Other features and advantages of the invention will become clear from the following explanation, which is not restrictive in any respect, of an example of an embodiment described with reference to the appended drawings, of which.

DETAILED DESCRIPTION OF THE INVENTION

Figure 1:
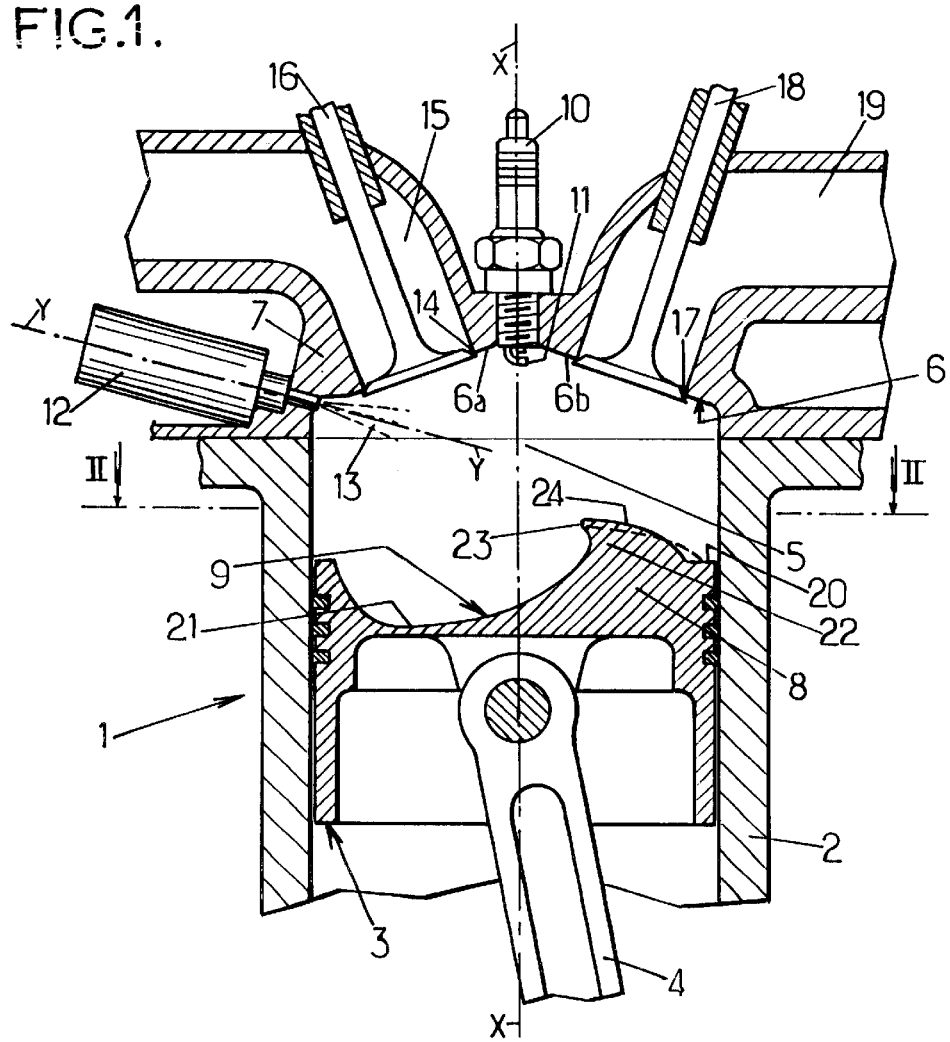
FIG. 1 is a partial schematic view in section of an internal combustion engine having a piston and a combustion chamber as proposed by the invention.

FIG. 1 is a schematic illustration In cross section of a four-stroke internal combustion engine 1 with controlled ignition and direct injection.

In a known manner, in each cylinder 2 disposed in the block of the engine 1, a piston 3 is mounted so as to slide axially in a reciprocating motion and linked to a crankshaft (not illustrated) by a linking rod 4.

At the top end of the piston 2, a combustion chamber 5 is delimited between a cavity 6 arranged facing the piston 3 in a cylinder head 7 joined to the block of the engine 1, and the end face 9 of the head 8 of this piston 3.

The cavity 6 of the cylinder head 7 is a "roof" type cylinder, substantially bounded by two inclined faces converging towards one another and being joined at the apex of the combustion chamber 5.

An ignition plug 10 is mounted in the cylinder head 7 coaxially with the axis X—X of the piston 3 and combustion chamber 5 so that its electrodes 11 open in the apex of the combustion chamber 5.

A fuel injector 12 is also mounted in the cylinder head 7, so that it delivers a fuel jet 13 directly into the combustion chamber 5, the fuel jet 13 being centred on an axis Y—Y which, for the sake of ease, is illustrated as being the axis of the injector 12, this axis Y—Y being inclined relative to the axis X—X at an angle which, in this example, is 73° and contained within the radial plane intersecting the axis X—X and the centre (perpendicular to the plane of FIG. 1) of one 6a of the two inclined faces 6a and 6b delimiting the cavity 6, and the fuel injector 12 is at the base of this face 6a having, in the vicinity of the top end of the cylinder 2 and substantially between two admission ports 14 at the downstream end of air admission ducts such as 15 and selectively closed and opened by admission valves such as 16, whilst an exhaust port 17 provided in the other inclined face 6b of the cavity 6 is selectively closed and opened by an exhaust valve 18 at the upstream end of an exhaust duct 19, the admission and exhaust ducts 15 and 19 being disposed in the cylinder head 7.

Air is admitted to the combustion chamber 5 by admission ports 14 on the same side as the injector 12 whilst the combustion gases resulting from combustion of the air/fuel mixture in the combustion chamber 5 are evacuated from the other side of the combustion chamber 5 via the exhaust port 17 and the corresponding duct 19.

In another variant, the engine may have one or more than two admission valves 16 and/or one or more exhaust valves 18.

Figure 2:
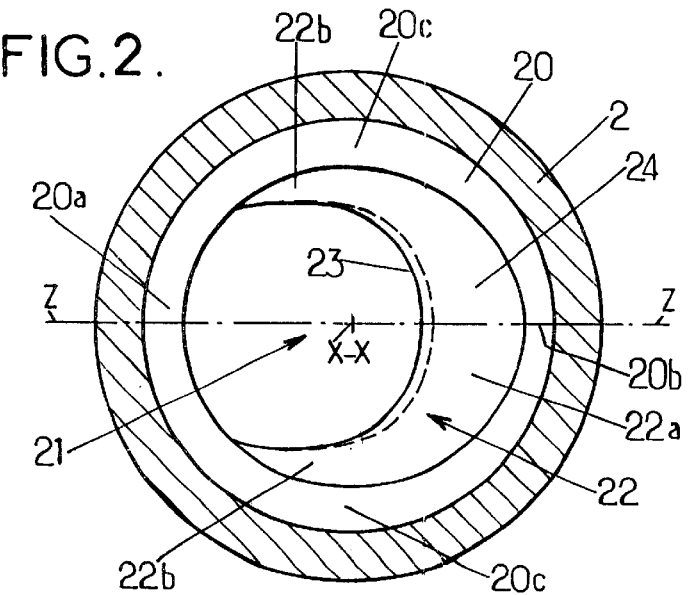
FIG. 2 is a plan view of the head of the piston illustrated in FIG. 1 and across a section of the corresponding cylinder.

The end face 9 of the piston head 8 is illustrated in section in FIG. 1 in the radial plane defined by the axes X—X and Y—Y in an intermediate point between bottom dead centre and top dead centre whereas FIG. 2 shows this end face 9 of the piston head 8 in a plan view looking along the axis X—X.

This end face 9 has a peripheral ring 20, which is planar and perpendicular to the axis X—X, inside which the end face 9 has a concave substantially bowl-shaped recess 21, the concave aspect being directed towards the combustion chamber 5 and eccentrically disposed on one side of the axis X—X and more specifically on the side directed towards the injector 12, although the recess 21 also extends partially into the other side of this axis X—X, i.e. the exhaust side.

Inside the planar peripheral ring 20, the top face 9 also has a boss 22, projecting towards the combustion chamber 5 standing proud of the peripheral ring 20 and eccentrically disposed on the side of the axis X—X facing the exhaust. However, as may be seen from FIG. 2, the shape of the boss 22 seen in a plan view is that of a horseshoe or crescent, the widest part of the base 22a thereof in the radial direction effectively being offset to the side of the X—X axis towards the exhaust (facing the valve or valves 18), but this base 22a is extended by two side wings 22b of a radial width which progressively decreases between the recess 21 and the ring 20.

Accordingly, the recess 21 is surrounded across the major part of its perimeter by the horseshoe-shaped boss 22 and across the remainder of this perimeter by an arc 20a of the peripheral ring 20, which arc 20a may be of an angular thickness which is symmetrically variable on either side of the diametric direction Z—Z shown underneath.

The recess 21 and the boss 22 are each symmetrical relative to a diametric direction Z—Z perpendicular to the axis X—X and in the radial plane containing the axis X—X of the injector 12.

The boss 22 has an overhanging rim 23 above the join between the recess 21 and the boss 22 and the amplitude of this overhanging rim 23, viewed perpendicularly to the axis X—X is at its maximum along the diametric direction Z—Z and progressively decreases on either side of this diametric direction Z—Z in the base 22a of the boss 22 and the parts of the wings 22b adjacent to the base 22a, becoming less pronounced until it disappears altogether at the ends of the wings 22b of the boss 22, as illustrated by the solid line indicating the rim 23 in FIG. 2 and the broken line indicating the base of the overhang.

In addition, the overhanging rim 23 is not delimited by a sharp edge but has a rounded cross section joining a concave surface in the extension of that of the recess 21 and a top face 24 of the boss 22 which is convex towards the combustion chamber 5.

In another variant, illustrated by the broken lines in FIG. 1, the boss 22 may have in its base 22a a top face 24 with a less pronounced convexity but extending across a larger radial width (perpendicular to the axis X—X) so that, behind the base 22a of the boss 22, the peripheral ring 20 has a minimum width of a low value in its section 20b along the diametric direction Z—Z (see FIG. 2) and its width increases progressively on either side of this minimum section 20b until it assumes a maximum width in its parts 20c on the sides of the wings 22b of the boss 22.

Moreover, the depth of the recess 21, viewed parallel with the axis X—X, increases substantially from the part of the recess 21 adjacent to the base 22a of the boss 22 towards the part of the recess 21 immediately adjacent to the peripheral ring 20, i.e. located facing the admission valve or valves 16 and underneath the injector 12.

When the piston 3 is directed towards the top dead centre, the fuel jet 13 projected by the injector 12, during late injection, is directed into the recess 21 towards the overhanging rim 23 on a level with the base 22a of the boss 22 and underneath this overhanging rim 23 and, as a result of this specific geometry of the end face 9 of the piston head 8 and its specific disposition relative to the inclined injector 12 and the axial pug 10, a combined guiding action is produced, which is firstly aerometric in the case of the lighter parts (vapour and small-diameter droplets) and secondly by a solid wall of heavy parts (large-diameter droplets), which ensures an excellent preparation of the air/fuel mixture with the fuel jet deflected towards the plug 10 and good vaporisation of the fuel as well as a high rate of local turbulence in the fuel/oxidiser mixture in the central zone of the recess 21, so that when operating with a poor mixture, a good stratification of this mixture is produced facing the plug 10 ensuring good combustion of this mixture.

Similarly, if air and fuel are supplied in stoichiometric and homogenous proportions using an injection in aspiration phase, the proposed geometry enables a zone of stoichiometric mixing to be created, being effectively at the centre of the combustion chamber 5 in the immediate proximity of the electrodes 11 of the plug 10.

During compression and the combustion phase, the transfer of unburned gases from the peripheral zone of the chamber 5 underneath the exhaust valve or valves 18 is improved due to the device for sweeping these gases, as a result of the convex shape of the top face 24 of the boss 22, both at the radially largest part of its base 22a and in its radially slimmer wings 22b, and due to the progressive increase in the radial width of the peripheral ring 20 from its zone of smallest section 20b across the diametric direction ZZ behind the base 22a of the boss 22 as far as its widest lateral parts 20c behind the wings 22b of the boss 22 relative to the axis X—X.

Accordingly, this convex shape of boss 22 between its overhanging rim 23 and the peripheral ring 20 reduces the volume in the combustion chamber 5 occupied by a mixture which does not exhibit good combustion characteristics.

Furthermore, the overhanging rim 23, having a rounded section rather than a sharp edge, enables swirling movements to be generated in the gas in the combustion chamber 5, which would otherwise have to be at least partially generated by specific means disposed upstream in the air supply circuit.

Clearly, the variable depth of the recess 21 may be optimised depending in particular on the diameter of the piston 3 as well as the inclination of the axis Y—Y of the injector 12 relative to the axis X—X of the piston 3 and chamber 5, this inclination preferably being between approximately 80° and approximately 45°.

What is claimed is:

1. A piston with an active guide head, for an internal combustion engine, in particular of the type having controlled ignition and direct fuel injection, the piston comprising a head of which an end face delimits a combustion chamber in conjunction with a cylinder of the engine, in which said piston is mounted so as to slide axially, and with a cavity disposed, facing the head of the piston, in a cylinder head joined to the cylinder of the engine, said end face having, inside a planar peripheral ring, perpendicular to the axis (X—X) of the piston, firstly, a bowl-shaped recess with a concave base open towards the combustion chamber and eccentrically disposed on one side of the axis (X—X) of the piston, and, secondly, a boss projecting towards the combustion chamber and eccentrically disposed on one side of the axis (X—X) of the piston, and, secondly, a boss projecting towards the combustion chamber standing proud of the peripheral ring and disposed eccentrically on the other side of the axis (X—X) of the piston, said recess and boss being symmetrical relative to a diametric direction (Z—Z) of the piston head, characterised in that in plan view, parallel with the axis (X—X) of the piston, said boss is of a substantially horseshoe shape partially surrounding said recess, which is also surrounded by an arc of said planar peripheral ring, and in that the boss has a rim overhanging the join of said recess to said boss, on a level with the base of the substantially horseshoe-shaped boss as well as the wings of the horseshoe-shaped boss which are adjacent to said base, and in that the amplitude of the overhanging of said rim, viewed in a plane perpendicular to the axis (X—X) of the piston, becomes progressively less pronounced from the centre of the base of the horseshoe-shaped boss towards the end of each of the two wings of said boss, at which ends the overhang is substantially zero.

2. The piston according to claim 1, wherein said overhanging rim is a rim with a rounded cross section.

3. The piston according to claim 1, wherein the depth of said recess, parallel with the axis (X—X) of the piston is variable, and larger in a part of the recess no adjacent to said base of said horseshoe-shaped boss.

4. The piston according to claim 2, wherein the depth of said recess, parallel with the axis (X—X) of the piston is variable, and larger in a part of the recess no adjacent to said base of said horseshoe-shaped boss.

5. The piston according to claim 1, wherein said horseshoe-shaped boss has a convex face directed towards the combustion chamber and of a radial width, relative to the axis (X—X) of the piston, which is at its maximum in said diametric direction (Z—Z) of symmetry of the recess and boss of the piston head and decreases progressively on either side of this direction (Z—Z) in the wings of the horseshoe-shaped boss.

6. The piston according to claim 2, wherein said horseshoe-shaped boss has a convex face directed towards the combustion chamber and of a radial width, relative to the axis (X—X) of the piston, which is at its maximum in said diametric direction (Z—Z) of symmetry of the recess and boss of the piston head and decreases progressively on either side of this direction (Z—Z) in the wings of the horseshoe-shaped boss.

7. The piston according to claim 3, wherein said horseshoe-shaped boss has a convex face directed towards the combustion chamber and of a radial width, relative to the axis (X—X) of the piston, which is at its maximum in said diametric direction (Z—Z) of symmetry of the recess and boss of the piston head and decreases progressively on either side of this direction (Z—Z) in the wings of the horseshoe-shaped boss.

8. The piston according to claim 4, wherein said horseshoe-shaped boss has a convex face directed towards the combustion chamber and of a radial width, relative to the axis (X—X) of the piston, which is at its maximum in said diametric direction (Z—Z) of symmetry of the recess and boss of the piston head and decreases progressively on either side of this direction (Z—Z) in the wings of the horseshoe-shaped boss.

9. The piston according to claim 1, wherein said planar peripheral ring has a variable radial width which is at its minimum along said diametric direction (Z—Z) and, on the side located behind said boss relative to said recess, the radial width of said peripheral ring increases progressively on either side of the section of the minimum width as far as the sides of the wings of the horseshoe-shaped boss.

10. The piston according to claim 2, wherein said planar peripheral ring has a variable radial width which is at its minimum along said diametric direction (Z—Z) and, on the side located behind said boss relative to said recess, the radial width of said peripheral ring increases progressively on either side of the section of the minimum width as far as the sides of the wings of the horseshoe-shaped boss.

11. The piston according to claim 3, wherein said planar peripheral ring has a variable radial width which is at its minimum along said diametric direction (Z—Z) and, on the side located behind said boss relative to said recess, the radial width of said peripheral ring increases progressively on either side of the section of the minimum width as far as the sides of the wings of the horseshoe-shaped boss.

12. The piston according to claim 4, wherein said planar peripheral ring has a variable radial width which is at its minimum along said diametric direction (Z—Z) and, on the side located behind said boss relative to said recess, the radial width of said peripheral ring increases progressively on either side of the section of the minimum width as far as the sides of the wings of the horseshoe-shaped boss.

13. The piston according to claim 5, wherein said planar peripheral ring has a variable radial width which is at its minimum along said diametric direction (Z—Z) and, on the side located behind said boss relative,to said recess, the radial width of said peripheral ring increases progressively on either side of the section of the minimum width as far as the sides of the wings of the horseshoe-shaped boss.

14. The piston according to claim 6, wherein said planar peripheral ring has a variable radial width which is at its minimum along said diametric direction (Z—Z) and, on the side located behind said boss relative to said recess, the radial width of said peripheral ring increases progressively on either side of the section of the minimum width as far as the sides of the wings of the horseshoe-shaped boss.

15. The piston according to claim 7, wherein said planar peripheral ring has a variable radial width which is at its minimum along said diametric direction (Z—Z) and, on the side located behind said boss relative to said recess, the radial width of said peripheral ring increases progressively on either side of the section of the minimum width as far as the sides of the wings of the horseshoe-shaped boss.

16. The piston according to claim 6, wherein said planar peripheral ring has a variable radial width which is at its minimum along said diametric direction (Z—Z) and, on the side located behind said boss relative to said recess, the radial width of said peripheral ring increases progressively on either side of the section of the minimum width as far as the sides of the wings of the horseshoe-shaped boss.

17. The piston according to claim 1, wherein said arc of the peripheral ring has an angular thickness which is symmetrically variable on either side of said diametric direction (Z—Z).

18. The piston according to claim 2, wherein said arc of the peripheral ring has an angular thickness which is symmetrically variable on either side of said diametric direction (Z—Z).

19. The piston according to claim 3, wherein said arc of the peripheral ring has an angular thickness which is symmetrically variable on either side of said diametric direction (Z—Z).

20. The piston according to claim 4, wherein said arc of the peripheral ring has an angular thickness which is symmetrically variable on either side of said diametric direction (Z—Z).

21. The piston according to claim 5, wherein said arc of the peripheral ring has an angular thickness which is symmetrically variable on either side of said diametric direction (Z—Z).

22. The piston according to claim 6, wherein said arc of the peripheral ring has an angular thickness which is symmetrically variable on either side of said diametric direction (Z—Z).

23. The piston according to claim 7, wherein said arc of the peripheral ring has an angular thickness which is symmetrically variable on either side of said diametric direction (Z—Z).

24. The piston according to claim 8, wherein said arc of the peripheral ring has an angular thickness which is symmetrically variable on either side of said diametric direction (Z—Z).

25. The piston according to claim 9, wherein said arc of the peripheral ring has an angular thickness which is symmetrically variable on either side of said diametric direction (Z—Z).

26. The piston according to claim 10, wherein said arc of the peripheral ring has an angular thickness which is symmetrically variable on either side of said diametric direction (Z—Z).

27. The piston according to claim 11, wherein said arc of the peripheral ring has an angular thickness which is symmetrically variable on either side of said diametric direction (Z—Z).

28. The piston according to claim 12, wherein said arc of the peripheral ring has an angular thickness which is symmetrically variable on either side of said diametric direction (Z—Z).

29. The piston according to claim 13, wherein said arc of the peripheral ring has an angular thickness which is symmetrically variable on either side of said diametric direction (Z—Z).

30. The piston according to claim 14, wherein said arc of the peripheral ring has an angular thickness which is symmetrically variable on either side of said diametric direction (Z—Z).

31. The piston according to claim 15, wherein said arc of the peripheral ring has an angular thickness which is symmetrically variable on either side of said diametric direction (Z—Z).

32. The piston according to claim 16, wherein said arc of the peripheral ring has an angular thickness which is symmetrically variable on either side of said diametric direction (Z—Z).

* * * * *